US006203697B1

(12) United States Patent
Ferguson (10) Patent No.: US 6,203,697 B1
(45) Date of Patent: *Mar. 20, 2001

(54) MODULAR MULTI-STAGE WATER FILTER APPARATUS (76) Inventor: George E. Ferguson, 303-327 Maitland St., Victoria, British Columbia (CA), V9A 7G7

(*) Notice: Subject to any disclaimer, the term of this patent is extended or adjusted under 35 U.S.C. 154(b) by 0 days.

This patent is subject to a terminal disclaimer.

(21) Appl. No.: 09/286,193

(22) Filed: Apr. 5, 1999

Related U.S. Application Data (63) Continuation of application No. 08/719,160, filed on Sep. 24, 1996, now Pat. No. 5,891,333.

(51) Int. Cl.[7] .......................... B01D 35/30; B01D 29/52; B01D 27/08
(52) U.S. Cl. .......................... 210/232; 210/238; 210/282; 210/323.2
(58) Field of Search .................................. 210/232, 238, 210/282, 323.2

(56) References Cited

U.S. PATENT DOCUMENTS

| D. 316,741 | 5/1991 | Kurth et al. . |
| 2,316,206 | 4/1943 | Wilson . |
| 2,489,362 | 11/1949 | Bastrup . |
| 3,043,432 | 7/1962 | Megesi . |
| 3,109,812 | 11/1963 | McAulay . |
| 3,535,235 | 10/1970 | Schouw . |
| 3,595,399 | 7/1971 | Abos . |
| 3,645,402 | 2/1972 | Alexander . |
| 3,679,060 | 7/1972 | Smith . |
| 3,734,297 | * 5/1973 | Windle . |
| 3,900,397 | 8/1975 | Bell . |
| 3,935,108 | 1/1976 | Forgues . |
| 3,950,253 | 4/1976 | Stern . |
| 3,951,811 | 4/1976 | Casolo et al. . |
| 3,963,620 | 6/1976 | Vor . |
| 4,049,550 | 9/1977 | Obidniak . |
| 4,108,775 | 8/1978 | Wilkes et al. . |
| 4,211,743 | 7/1980 | Van Meter . |
| 4,271,015 | 6/1981 | Moore . |
| 4,303,521 | 12/1981 | Lehmann . |
| 4,312,754 | 1/1982 | LaFontaine . |
| 4,347,136 | 8/1982 | Freisen . |
| 4,497,348 | 2/1985 | Sedam . |
| 4,509,569 | 4/1985 | Adolfsson . |
| 4,514,994 | 5/1985 | Mabb . |
| 4,528,097 | 7/1985 | Ward . |

(List continued on next page.)

FOREIGN PATENT DOCUMENTS

| 0296043 | 12/1988 | (EP) . |
| WO/9116124 | 10/1991 | (WO) . |

* cited by examiner

Primary Examiner—Thomas M. Lithgow
(74) Attorney, Agent, or Firm—Sonneschein Nath & Rosenthal (57) ABSTRACT

A multi-stage, modular water filter apparatus having at least first and second filter housings engageable with one and other, and each being engageable with a water inlet member, a water outlet member and a fluid filter cartridge for removing undesired components in a water supply.

8 Claims, 4 Drawing Sheets

U.S. PATENT DOCUMENTS

| | | |
|---|---|---|
| 4,541,926 | 9/1985 | Stanley . |
| 4,564,126 | 1/1986 | Adlofsson . |
| 4,597,509 | 7/1986 | Pereira . |
| 4,609,466 | 9/1986 | McCausland . |
| 4,654,141 | 3/1987 | Frentzel . |
| 4,693,820 | 9/1987 | Baxter . |
| 4,708,827 | 11/1987 | McMillin . |
| 4,765,906 | 8/1988 | Downing et al. . |
| 4,781,830 | 11/1988 | Olsen . |
| 4,798,672 | 1/1989 | Knight . |
| 4,944,875 * | 7/1990 | Gaignet . |
| 5,006,245 | 4/1991 | Edwards et al. . |
| 5,015,375 | 5/1991 | Fleck . |
| 5,021,250 | 6/1991 | Ferguson . |
| 5,035,798 | 7/1991 | Stenger . |
| 5,108,599 | 4/1992 | Lowery . |
| 5,116,502 | 5/1992 | Ferguson . |
| 5,188,727 | 2/1993 | Kurth et al. . |
| 5,277,805 | 1/1994 | Ferguson . |
| 5,405,528 * | 4/1995 | Selbie . |
| 5,656,159 | 8/1997 | Spencer et al. . |
| 5,891,333 * | 4/1999 | Ferguson . |

MODULAR MULTI-STAGE WATER FILTER APPARATUS

CROSS-REFERENCE TO RELATED APPLICATION

This application is related to and claims priority as a continuation of U.S. application Ser. No. 08/719,160 filed Sep. 24, 1996 (now U.S. Pat. No. 5,891,333).

BACKGROUND OF THE INVENTION

The present invention relates generally to water filtration apparatus, particularly multistage water filters adapted for use as residential or commercial countertop or undercounter water filters for producing potable water for suitable for human ingestion such as by drinking or cooking. More particularly, the present invention provides a multi-stage water filter apparatus which is modular to permit scale up or scale down filtration capacity.

A wide variety of water filtration devices are known in the art. Residential and office-type water filter devices are typically of the countertop variety which consist generally of vertically oriented cylinders which receive water from a diverter valve attached to a sink faucet and introduce tap water to the bottom of a charcoal stack, flow the water upward against gravity and dispense the filtered water from a spigot located at the top of the charcoal stack. The configuration of these units is bulky and requires that the filter units be inconveniently located adjacent the sink where they interfere with routine tasks such as washing dishes or food preparation. Moreover, the tubing interconnecting the diverter valve and the filtration apparatus is obtrusive and potentially dangerous to those people working near the sink. Accordingly, a need has existed for a water filtration apparatus which is easily used in conjunction with residential or office water distribution systems, which may be used only when it is necessary to provide a supply of drinking or cooking water, is unobtrusive and may otherwise be situated away from kitchen utility areas, and which is easily adaptable to increase or decrease its filtering capacity by addition or removal of modular housing units.

SUMMARY OF THE INVENTION

The present invention provides a water filtration and purification apparatus which consists generally of a multi-stage, modular system which is well-adapted for countertop or below-counter applications in a residential or office kitchen, in connection with a kitchen sink faucet or faucet water supply plumbing line to filter tap water and dispense potable water. The basic modular unit of the inventive water filtration apparatus consists of a filter cartridge housing having a longitudinal chamber which receives a filtration cartridge containing a filtration medium for removing a desired component present in a particular water source. The filter cartridge housing is open at each end thereof. A pair of end cap members, an inlet end cap member and an outlet end cap member, engage and seal the open ends of the filter cartridge housing and permit fluid flow communication into and through the end cap members in order to provide a fluid inflow into the filter cartridge housing or a fluid outflow from the filter cartridge housing. The filter cartridge housing may be coupled to one or more of a plurality of additional filter cartridge housings using a coupling fitting associated with each of the plurality of filter cartridge housings. Each filter cartridge housing will operate when placed in either a horizontal or vertical orientation relative to a support surface upon which the filter cartridge housing resides.

It is therefore a principal objective of the present invention to provide a modular, multi-staged water filter apparatus suitable for use in undercounter or countertop, commercial or residential use to produce potable water.

It is another objective of the present invention to provide a water filter apparatus which includes user removable and replaceable filter cartridges capable of permitting interchange ability of the filter medium used to filter water.

It is still another objective of the present invention to provide a water filter apparatus which is characterized by a longitudinally oriented housing which may be oriented either horizontally or vertically relative to a support surface, such as a countertop.

It is a further objective of the present invention to provide a modular, multistage water filter apparatus having user removable and replaceable cartridges containing filter media which are readily engaged into and removed from the longitudinally oriented housing.

It is a still further objective of the present invention to provide a modular, multi-staged water filter apparatus capable of utilizing multiple filter media cartridges to filter different and distinct types of water contaminants from the water supply.

These and other objects features and advantages of the present invention will become more apparent to, and better understood by, those skilled in the relevant art from the following more detailed description of the preferred embodiments of the invention taken with reference to the accompanying drawings, in which like features are identified by like reference numerals.

DETAILED DESCRIPTION OF THE PREFERRED EMBODIMENTS

Figures 1, 2A, 3, 4, 5:
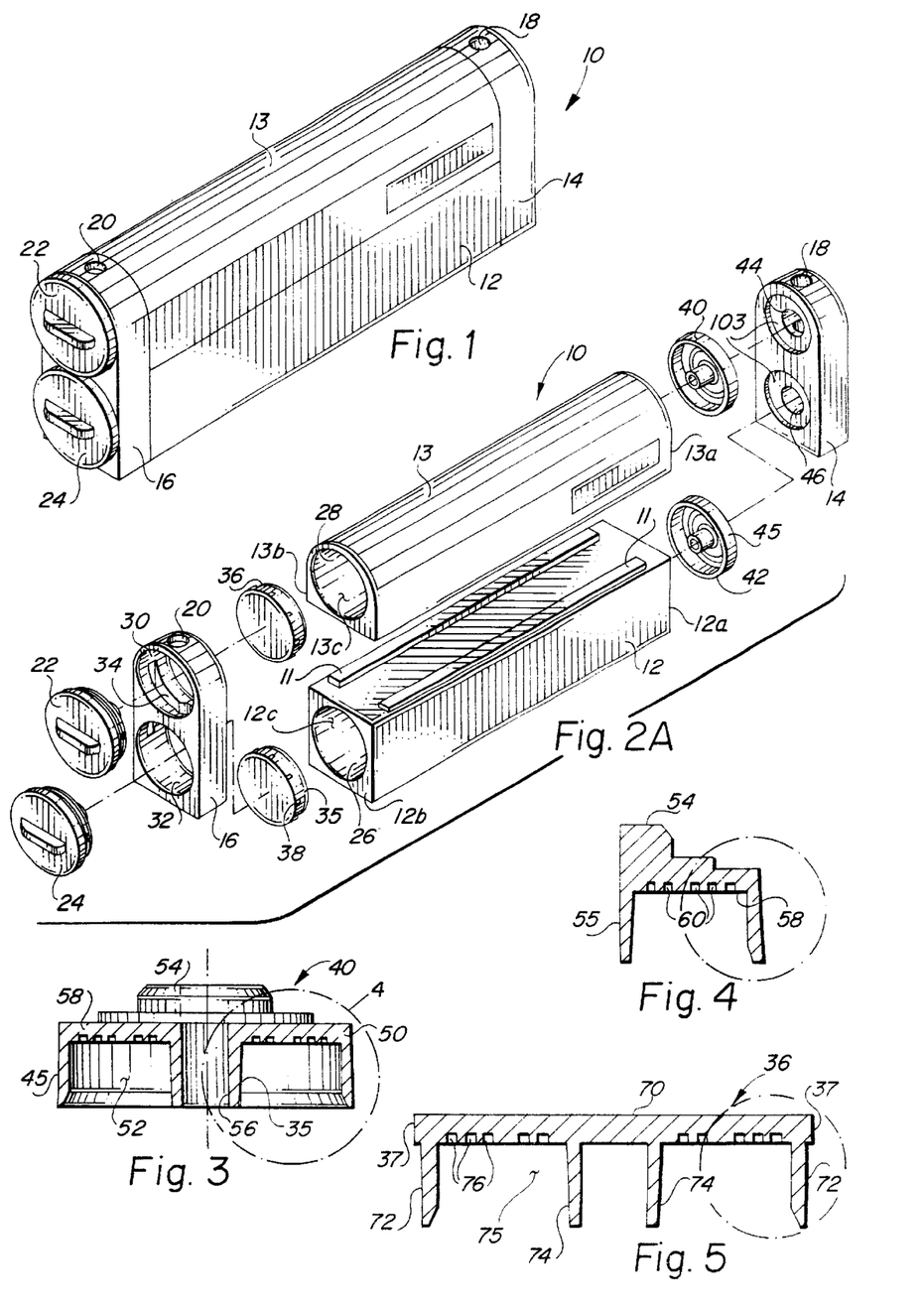
FIG. 1 is a perspective view of a modular, multi-staged water filter apparatus in accordance with the present invention.
FIG. 2A is a first exploded, perspective view of the inventive modular, multi-staged water filter apparatus.
FIG. 3 is a cross-sectional view of an open end cap member of the inventive modular, multi-staged water filter apparatus.
FIG. 4 is a detail view of detail 4 represented by a phantom circle in FIG. 3.
FIG. 5 is a cross-sectional view of a closed end cap member of the inventive modular, multi-staged water filter apparatus.

The inventive modular, multi-stage water filter apparatus 10 is illustrated in its fully assembled condition in FIG. 1, depicted with neither the incoming water supply line [not shown] or the water outlet spigot [not shown]. The inventive water filter apparatus 10 consists generally of a first filter housing member 12, a second filter housing member 13, a water outlet end cap member 14, a water inlet end cap member 16, a water outlet opening 18 emanating from the water outlet end cap member 14, a water inlet opening 20 passing into the water inlet end cap member 16, and first and second plug members 22, 24 removably coupled to the water inlet end cap member 16. In accordance with the preferred embodiment for the present invention, the first filter housing member 12 and the second filter housing member 13 are formed as discrete housing members, each having a generally elongate profile, and being removably engageable with one and other.

Figures 2B, 7:
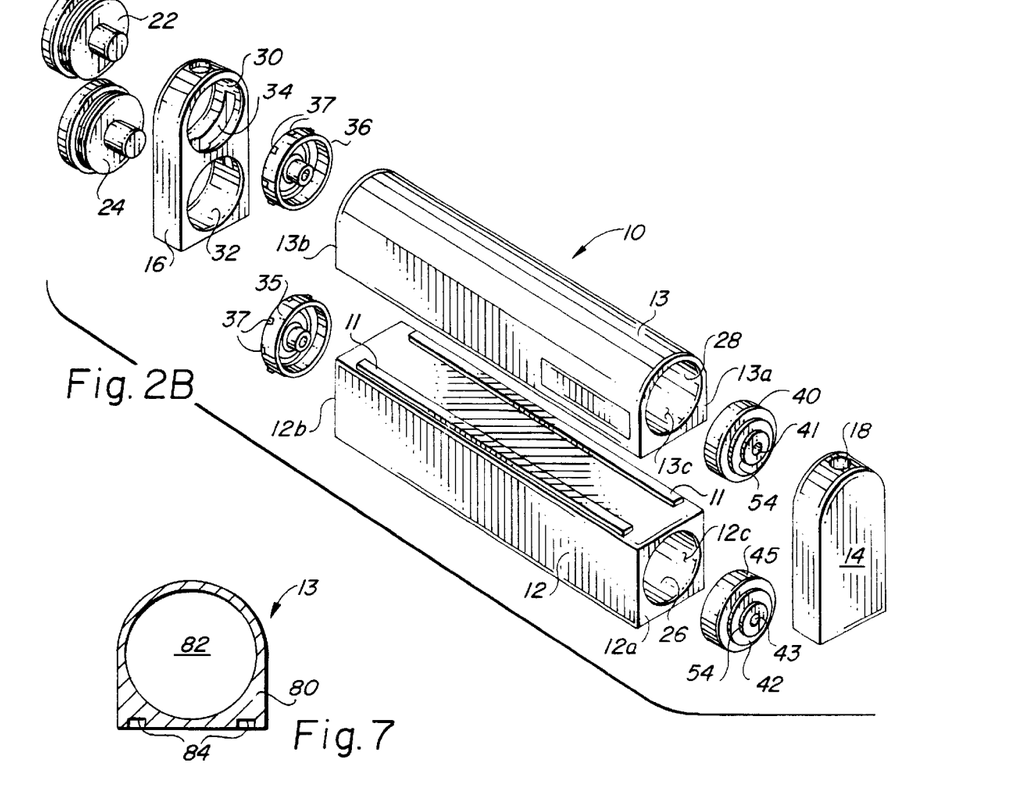
FIG. 2B is a second exploded, perspective view of the inventive modular, multi-staged water filter apparatus.
FIG. 7 is a cross-sectional view taken along line 7—7 of FIG. 6.

FIGS. 2A and 2B illustrate the inventive water filter apparatus 10 in its exploded view and more clearly depicts the component parts comprising the water filter apparatus 10. As can be clearly seen in FIGS. 2A and 2B, and in accordance with the preferred embodiments of the invention, the first filter housing member 12 and the second filter housing member 13 are discrete, generally tubular structures. A means 11 for removably engaging the first 12 and second 13 filter housing members is provided on at least one outer surface of each of the first 12 and second 13 filter housing members to enable their coupling and decoupling to one another. As illustrated in the accompanying figures, means 11 may consist of a plurality of elongate projections emanating from a surface of the first filter housing member 12, and a plurality of correspondingly positioned and sized elongate recesses [not shown] in a mating surface of second filter housing member 13. The plurality of elongate projections and the plurality of elongate recesses are more clearly illustrated in FIGS. 6–9, and will be discussed in greater detail hereinafter.

The first filter housing member 12 has an interior opening 26 which passes through an entire longitudinal axis of the first filter housing member 12 and is open at each of a first end 12a and a second end 12b of the first filter housing member 12. The second filter housing member 13 also has an interior opening 28 which passed through an entire longitudinal axis of the second filter housing member 13 and is open at each of a first end 13a and a second end 13b of the second filter housing member 13. Each of the interior opening 26 and interior opening 28 in the first filter housing member 12 and the second filter housing member 13, respectively, receive a filter cartridge member [not shown] which is more fully illustrated in and described with reference to FIG. 15 hereinafter.

Open end cap members 40, 42 engage within the first end 12a and 13a of each of the first filter housing member 12 and the second filter housing member 13, respectively. Each of the open end cap members 40, 42 have an opening 41, 43, respectively, which passes through the open end cap member 40, 42 to permit fluid flow communication through each off the open end cap members 40, 42. The open end cap members 40, 42 are preferably dimensioned to fit within the interior opening 26 or 28 at the first end 12a or 12b of either of the first filter housing member 12 or the second filter housing member 13.

Closed end cap members 36, 38 engaged with the second end 13b and 13b of each of the first filter housing member 12 and second filter housing member 13, respectively. Each of the closed end cap members 36, 38 have a plurality of fluid flow means 37 disposed about an outer peripheral surface thereof which permit a fluid flow to pass about each of the closed end cap members 36, 38. In accordance with the preferred embodiments of and best mode contemplated for the present invention, the plurality of fluid flow means 37 comprise a plurality of projections extending radially outward from outer peripheral surfaces 35, 45 and spaced apart from one and other about the entire periphery of each of the closed end cap members 36, 38. The closed end cap members 36, 38 are dimensioned to fit within the interior opening 26 or 28 at the second end 12b or 13b of either of the first filter housing member 12 or the second filter housing member 13. When the closed end cap members 36, 38 are engaged within the interior opening 26, 28 at the second end 12b or 13b of either the first filter housing member 12 or the second filter housing member 13, the plurality of projections 37 abut against inner surfaces 12c or 13c of the interior opening 26 or 28 and, thereby, retain the closed end cap members 36, 38 in spaced apart relationship relative to the inner surfaces 12c, 13c of the interior opening 26 or 28, thus defining a fluid flow annular opening between the outer peripheral surfaces 35, 45 of the closed end cap members 36, 38 and the inner surfaces 12c, 13c of the interior opening 26 or 28 of the first filter housing member 12 or the second filter housing member 13.

An outlet member 14 couples to each of the first ends 12a and 13a of the first filter housing member 12 and second filter housing member 13, respectively. The outlet member 14 is preferably configured to have a shape which conforms to the overall shape of the first and second filter housing members 12, 13 in their assembled condition in order to provide an outer surface of the water filter apparatus 10 which is smooth with all outer surfaces of the apparatus 10 mating with one and other. The outlet member 12 has at least two outlet openings 44, 46 which mate with each of the open end cap members 40, 42, respectively, such that the openings 41, 43 in the open end caps members 40, 42 are in fluid flow communication with the outlet openings 44, 46, respectively. It is preferable that the outlet member 14 be coupled to each of the first ends 12a and 13a of the first and second filter housing members 12, 13 in a fluid tight arrangement to prevent leakage of water at their junction. As will be described in greater detail hereinafter with reference to FIGS. 3–4 and 10–11, each of the open end cap members 40, 42 preferably have engagement projections 54 and each of the outlet openings 44, 46 have annular recesses 103, concentrically positioned about the outlet openings 44, 46, which mate with and receive the engagement projections 54 in the open end cap members 40, 42. The engagement between the engagement projections 54 and the annular recesses 103 is fluid tight to prevent leakage from the outlet member 14 while permitting fluid flow communication through the outlet openings 44 and 46 in the outlet member 14. The outlet member 14 has an internal flow channel [not shown] which communicates with each of the plurality of outlet openings 44, 46 and an outlet port 18 which conducts fluid external the water filter apparatus 10, such as through a dispensing spigot [not shown].

An inlet member 16 is coupled to each of the second ends 12b, 13b of the first filter housing member 12 and the second filter housing member 13, respectively. The inlet member 16 permits a fluid inflow from an external water supply source, through the inlet member 16, around the closed end cap members 36, 38 and into each of the interior openings 26, 28 of the first filter housing member 12 and the second filter housing member 13. The inlet member 16, like the outlet member 14, is preferably configured to have a shape which conforms to the overall shape of the first and second filter housing members 12, 13 in their assembled condition in order to provide an outer surface of the water filter apparatus 10 which is smooth with all outer surfaces of the apparatus 10 mating with one and other. The inlet member 16 has at least two inlet openings 30, 32 which pass through the inlet member and communicate with the interior openings 26, 28 in the first and second filter housing members 12, 14 on one lateral surface of the inlet member 16 and open at a second lateral surface of the inlet member 16 to permit insertion and removal of filter cartridges [not shown]. Plug members 22, 24 are removably engageable within each of the at least two inlet openings 30, 32 to provide access for insertion and removal of filter cartridges into the interior openings 26, 28 in the first and second filter housing members 12, 14 and to provide a fluid tight seal with the inlet member 16. The plug members 22, 24 preferably threadedly engage with mating threads on interior peripheral surfaces of the at least two inlet openings 30, 32 and have o-rings or other seals to provide a fluid tight seal.

The at least two inlet openings 30, 32 in the inlet member 16 have a channel 34 which passes therebetween to permit fluid flow communication between the at least two inlet openings 30, 32. In this manner water entering the inlet member 16 through an inlet port 20 in the inlet member 16, passes into a first inlet opening 30, through the inlet channel 34 and into the second inlet opening 32 in order to provide a fluid flow to each of interior openings 26, 28 in the first and second filter housing members 12, 14.

FIGS. 3 and 4, of which FIG. 4 is a detail view taken at phantom line 4 of FIG. 3, more particularly illustrates an open end cap member 40. Each open end cap member consists of a cap body 50 having a substantially planar top section 58 and the outer peripheral surface section 45 which projects substantially perpendicularly outward from the planar top section 58 thereby defining the cap cavity 52. Engagement projection 54 extends outward from the planar top section 58 of the open end cap member 40 in a direction substantially opposite that of the outer peripheral surface section 45. A central opening 56 passes along the central axis of the open end cap member 40 and extends through the planar top section 58 and the engagement projection 54. It is preferable that a generally tubular nipple member 55, co-axial with the central opening 56, project into the cap cavity 52. As will be described in greater detail hereinafter, the tubular nipple member 55 aids in engaging the open end cap member 40 with a filter cartridge [not shown]. In accordance with the preferred embodiment a plurality of adhesive recesses 60 may be provided in the planar top section 58 communicating with the cap cavity 52 to facilitate attaching the open end cap member 40 with a filter cartridge [not shown] using an adhesive loaded into the plurality of recesses 60 to which a tubular filter cartridge may be attached with the nipple member 55 extending co-axially with the lumen of the tubular filter cartridge. The plurality of adhesive recesses 60 may be provided as concentric rings on the cavity 52 side of the planar top section 58. The closed cap member 36 is illustrated more particularly with reference to FIG. 5. Closed cap member 36 consists generally of a cap body 70 defining a planar top surface having projections 37 extending radially outward therefrom. Cap flange 72 extends perpendicularly from the planar top surface to define closed cap cavity 75. A plurality of adhesive recesses 76 are provided in the cap body 70 and within the cap cavity to facilitate adhesive affixation of the closed cap member to a filter cartridge [not shown]. Like with the open end cap member 40, the closed cap member 36 also preferably includes a nipple member 74 extending into the closed cap cavity 75 to facilitate co-axial engagement of the closed cap member 70 with the lumen of the tubular filter cartridge [not shown].

Figure 6:
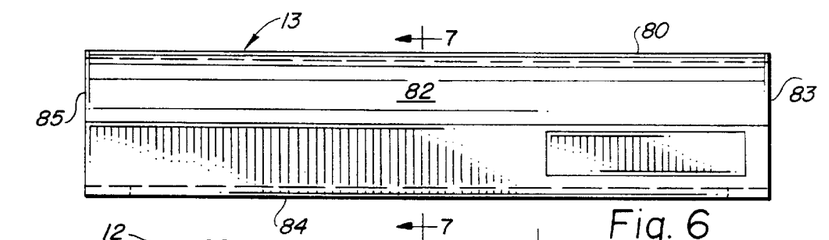
FIG. 6 is a side elevational view of an upper filter cartridge housing of the inventive modular, multi-staged water filter apparatus.
Figure 8:
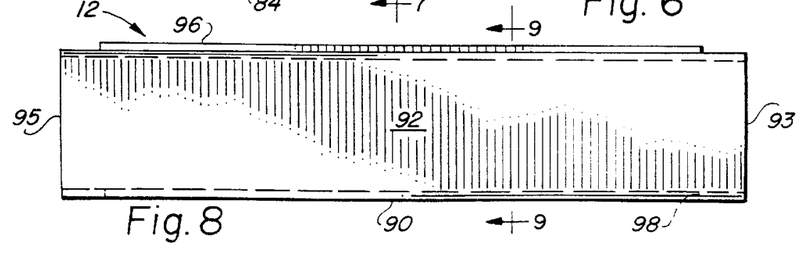
FIG. 8 is a side elevational view of a filter cartridge housing of the inventive modular, multi-staged water filter apparatus.
Figures 9, 10:
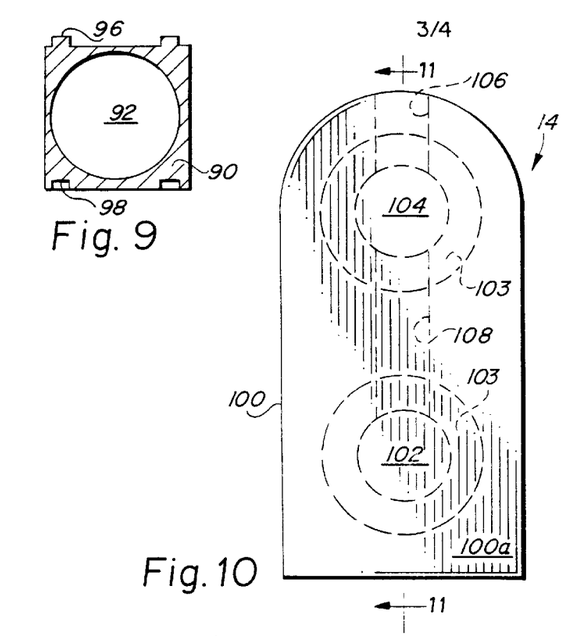
FIG. 9 is a cross-sectional view taken along line 9—9 of FIG. 8.
FIG. 10 is an end elevational view of an outlet end cap member of the inventive modular, multi-staged water filter apparatus.

The first and second filter housing members 12, 13 are more particularly illustrated in FIGS. 6–9. FIGS. 6–7 depict a second filter housing member 13 having an arcuate top profile as illustrated in FIG. 7. FIGS. 8–9 depict the first filter housing member 12 having a generally planar top profile as illustrated in FIG. 9. Those skilled in the art will understand that the arcuate profile of the second filter housing member 13, or the planar top profile of the first filter housing member 12 is largely a matter of design choice and may have any desired configuration or shape. It is important, however, that each of the first and second filter housing members 12, 13 have at least one surface capable of mating with one and other.

Each of the first and second filter housing members 12, 13 are comprised of a housing body 90, 80 and have a generally tubular shape with an elongate central opening 92, 82 in the housing body 90, 80 which operates as a fluid flow chamber. The first and second filter housing members 12, 13 further have engagement means 96, 84 associated with the at least one mating surface on each of the first and second filter housing members 12, 13 which permit removable engagement between the first and second filter housing members 12, 13. As illustrated in FIGS. 6–9, the second filter housing member 13 has a plurality of parallel recesses 84 extending longitudinally along one surface of the second filter housing member 13. The first filter housing member 12 has a corresponding plurality of parallel projections 96 extending longitudinally along one surface of the first filter housing member 12. The plurality of parallel recesses 84 and the plurality of parallel projections 96 are dimensioned to frictionally engage one another to impart an interference fit therebetween to mate the first and second filter housing members 12, 13. It will further be noted that a second set of a plurality of parallel recesses 98 may also be formed in a surface of the first filter housing member 12 opposite that of the plurality of parallel projections 96. By providing the second set of a plurality of parallel recesses 98 permits a user to engage either another first filter housing member 12 or another second filter housing member 13 thereto to expand the filtering capacity of the filter apparatus 10.

Figure 11:
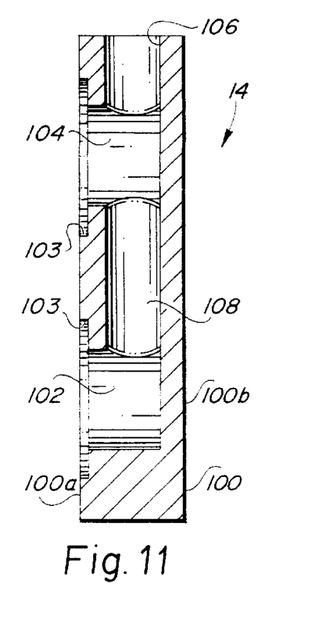
FIG. 11 is a cross-sectional view taken along line 11—11 of FIG. 10.

FIGS. 10 and 11 more specifically depict the outlet member 14. Outlet member 14 consists generally of a member body 100 having opposing lateral surfaces 100a, 100b. A first lateral surface 100a has the at least two outlet openings 102, 104 passing through it, while the second lateral surface 100b is solid and without openings communicating through it. The second lateral surface 100b thus forms one of the outermost surfaces of the filter apparatus 10. The at least two outlet openings 102, 104 pass through the first lateral surface 100a and are each bounded by a concentric recess 103. As noted above, concentric recess 103 facilitates connection with engagement projections 54 in the open end cap members 40, 42. An outlet channel 108 resides within the member body 100 and communicates between the at least two outlet openings 102, 104 and outlet port 106. In this manner water entering each of the at least two outlet openings 102, 104 is conducted through the outlet channel 108, out of outlet port 106 and external to filter apparatus 10.

Figure 12:
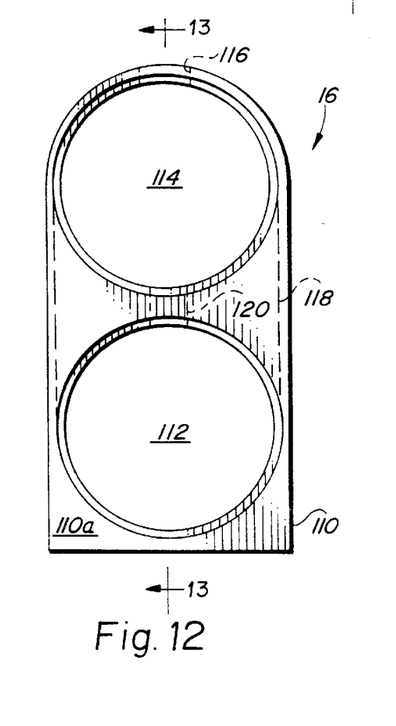
FIG. 12 is an end elevational view of an inlet end cap member of the inventive modular, multi-staged water filter apparatus.
Figure 13:
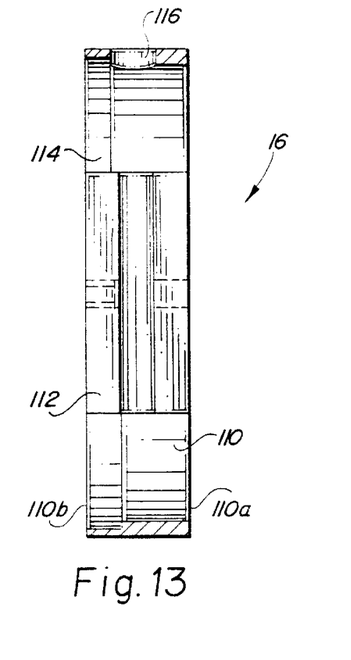
FIG. 13 is a cross-sectional view taken along line 13—13 of FIG. 12.
Figure 14:
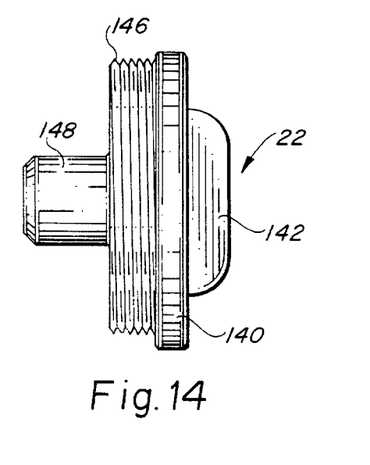
FIG. 14 is a side elevational view of an end cap fastener member of the inventive modular multi-staged water filter apparatus.

FIGS. 12 and 13 more particularly depict inlet member 16. Inlet member 16 consists generally of an inlet member body 110 having opposing lateral surfaces 110a and 110b, and at least two inlet openings 112, 114 passing through the inlet member body 110 and opening at both of the opposing lateral surfaces 110a and 110b. An inlet channel 118 communicates between the at least two inlet openings 112, 114, and may be divided by a support web 120 to lend structural support to the inlet member body 110. An inlet port 116 communicates with the at least two inlet openings 112, 114 and the inlet channel 118 to introduce water into the inlet member body 110. As noted above, each of the at least two inlet openings 112, 114 is preferably sealed with a plug member 22 more particularly illustrated with reference to FIG. 14. Plug member 22 consists generally of a plug body 140 having a projection 142 to facilitate rotational movement of the plug body 140 for insertion and removal from one of the at least two inlet openings 112, 114. A threaded region 146 extends outwardly from the plug body 140 to permit engagement with threads disposed in the at least two inlet openings 112, 114 [not shown]. Finally, an abutment projection 148 extends outwardly from the threaded region of the plug body 140. The abutment projection 148 serves to abut and exert a positive pressure against the body 70 of the closed cap member 36, when the closed cap member 36 is coupled to a filter cartridge and is inserted into the longitudinal fluid flow chambers 26, 28 in each of the first and second filter housing members 12, 13. In this manner the water filter apparatus 10 is sealed in a water tight manner and a filter cartridge is seated within each of the fluid flow chambers 26, 28 in the first and second filter housing members 12, 13.

Figure 15:
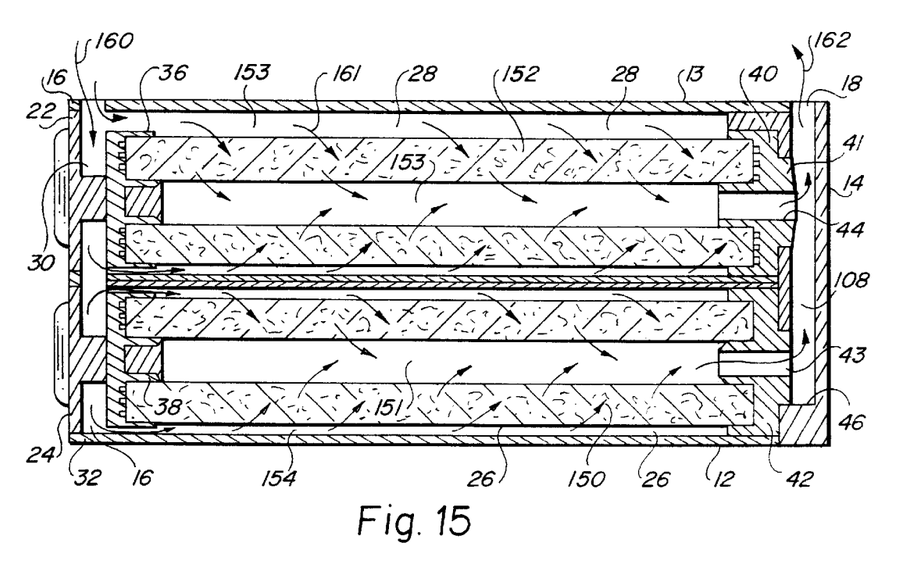
FIG. 15 is a cross-sectional view taken along the longitudinal axis of the inventive modular multi-staged water filter apparatus illustrating fluid flow therethrough.

Finally, FIG. 15 illustrates the inventive water filter apparatus 10 in its assembled condition depicted with a fluid flow 160 passing into the water filter apparatus 10. As will be seen in FIG. 15, the first filter housing member 12 is coupled to the second filter housing member 13 in a stacked relationship, with the first filter housing member 12 residing underneath the second filter housing member 13. The inlet member 16 and the outlet member 14 are coupled to opposing ends of both the first filter housing member 12 and the second filter housing member 13. Filter cartridge members 150, 152 composed of a generally tubular filter medium, which may be constrained in a supporting structure which permits fluid flow therethrough [not shown], are coupled to the closed cap members 36, 38 on the inlet side of the filter cartridge member and to the open end cap members 40, 42 on the outlet side of the filter cartridge member. The filter cartridge members are co-axially placed in the fluid flow chambers 26, 28 in each of the first and second filter housing members 12, 13 and the plugs 22, 24 are secured in the inlet member 16 and secured against the closed cap members 36, 38 thereby seating the filter cartridges 150, 151.

The projections 38 extending outward from the outer peripheral surfaces 35 of each of the closed cap members 36, 38 and the cap flanges 72 on each of the open cap members 40, 42 abut against the fluid flow chambers 26, 28 to hold the filter cartridges in spaced apart relationship with the inner surfaces of the fluid flow chambers 26, 28 thereby defining fluid flow channels 153, 154 therebetween. Water entering the fluid flow channels 153, 154 is forced through the filter medium in the filter cartridges 150, 151 by the ambient water pressure, thereby exposing the water to the desired filter medium. After passing through the filter cartridge filter medium 150, 151, the water passes into the lumen of the filter cartridge 150, 151 where it is conducted through the openings 41, 43 in each of the open end cap members 40, 42. After passing from the open end cap members 40, 42, the filtered water flow is passed through the at least two openings in the outlet member 14, through outlet channel 108 and out of outlet port 18.

It is preferable that the inlet member 14 and the outlet member 16, and the first and second filter housing members 12, 13, be affixed to one and other, such as by ultrasonic welding. The number of first and second filter housing members 12, 13 which may be joined to one another may be varied. Thus, for example, the filter apparatus 10 may include two housing members, three housing members, four housing members, or more, depending upon the capacity desired. It will be appreciated, however, that the inlet member 14 and the outlet member 16 must be similarly altered to include a correspondingly greater number of inlet openings 30, 32 in the inlet member 16 and a greater number of outlet openings 44, 46 to correspond with the number of housing members selected. Those skilled in the art will also understand that various other methods of attachment of the component parts, materials used to make the filter housings, open or closed end caps, plugs or inlet or outlet members, or various filter media, such as activated charcoal, ceramic, reverse osmosis membranes, ultra-violet disinfectants, or the like may be employed, without departing from the scope of the present invention, which is limited only by the claims appended hereto.

I claim:

1. A water filtration apparatus, comprising:
  A. a first filter housing member having an elongate opening passing therethrough and open at first and second ends of the first filter housing member;
  B. a second filter housing member having an elongate opening passing therethrough and open at first and second ends thereof, the second filter housing member being integrally connected to the first filter housing member;
  C. a water inlet member engageable with the first end of both the first filter housing member and the second filter housing member wherein said water inlet member further comprises:
    i. an inlet body member having opposing lateral surfaces;
    ii. said inlet body member having at least two inlet openings passing through the inlet body member and opening at both of the opposing lateral surfaces, the at least two inlet openings in fluid flow communication with both the elongated openings of said first and second filter housing members;
    iii. said inlet body member having an inlet channel communicating between the at least two inlet openings of said inlet body member;
    iv. said inlet body member having a water inlet port which permits fluid inflow from an external water supply into said water inlet member, the water inlet port in fluid flow communication with at least one of the at least two inlet openings of said inlet body member to allow fluid to pass into the at least two inlet openings of said inlet body member; and
    v. said inlet body member further comprising at least two inlet plug members, said two inlet plug members removably coupled to fit within the at least two inlet openings of said inlet body member;

D. a water outlet member engageable with the second end of both the first filter housing member and the second filter housing member; and E. at least two filter cartridge members, each being removably engageable within the elongate openings passing through the first filter housing member and the second filter housing member, each of the at least two filter cartridge members being in fluid flow communication between both the water inlet member and the water outlet member such that water passing into the water inlet member is conducted into the elongate openings in either the first filter housing member or the second filter housing member, through both of the at least two filter cartridge members, and out through the water outlet member.

2. A water filtration apparatus as recited in claim 1 wherein said first housing member is stacked above said second housing member.

3. A water filtration apparatus as recited in claim 2 wherein each of said first and second filter housing members have an inner surface, and wherein the inner surfaces of said housing members are separated from each other by a unitary portion integral to both of said housings.

4. A water filtration apparatus as recited in claim 1, wherein said inlet member is shaped to conform to the overall shape of said first and second housing members.

5. A water filtration apparatus adapted to fit and reside behind a conventional faucet, comprising:

A. a first filter housing member having an elongate opening passing therethrough and open at first and second ends of the first filter housing member;

B. a second filter housing member having an elongate opening passing therethrough and open at first and second ends thereof, the second filter housing member being integrally connected to the first filter housing member;

C. a water inlet member engageable with the first end of both the first filter housing member and the second filter housing member wherein said water inlet member further comprises:

i. an inlet body member having opposing lateral surfaces;

ii. said inlet body member having at least two inlet openings passing though the inlet body member and opening at both of the opposing lateral surfaces, the at least two inlet openings in fluid flow communication with both the elongated opening of said first and second filter housing members;

iii. said inlet body member having an inlet channel communication between the at least two inlet openings of said inlet body member;

iv. said inlet body member having a water inlet port which permits fluid inflow from an external water supply into said water inlet member, the water inlet port in fluid flow communication with at least one of the at least two inlet openings of said inlet body member to allow fluid to pass into the at least two openings of said inlet body member; and v. said inlet body member further comprising at least two inlet plug members, said two inlet plug members removably coupled to fit within the at least two inlet openings of said inlet body member;

D. a water outlet member engageable with the second end of both the first and second filter housing members; and E. at least two filter cartridge members, each being removably engageable within the elongate openings passing through the first filter housing member and the second filter housing member.

6. A water filtration apparatus as recited in claim 5 wherein said first housing member is stacked above said second housing member.

7. A water filtration apparatus as recited in claim 5 wherein each of said first and second filter housing members have an inner surface, and wherein the inner surfaces of said housing members are separated from each other by a unitary portion integral to both of said housings.

8. A water filtration apparatus as recited in claim 5, wherein said inlet member is shaped to conform to the overall shape of said first and second housing members.

* * * * *